United States Patent [19]

Meyer

[11] Patent Number: 4,737,365
[45] Date of Patent: Apr. 12, 1988

[54] METHOD OF FEEDING CATTLE TO IMPROVE PROTEIN UTILIZATION

[75] Inventor: Edwin W. Meyer, Chicago, Ill.

[73] Assignee: Central Soya Company, Inc., Fort Wayne, Ind.

[21] Appl. No.: 818,617

[22] Filed: Jan. 13, 1986

[51] Int. Cl.$^4$ .............................................. A23K 1/18
[52] U.S. Cl. ......................................... 426/2; 426/74; 426/454; 426/623; 426/630; 426/807
[58] Field of Search .................... 426/2, 74, 623, 630, 426/454, 807; 514/494

[56] References Cited

U.S. PATENT DOCUMENTS 3,463,858  8/1969  Anderson .......................... 514/494
4,225,620  9/1980  Rawlings et al. ................ 426/807 X

FOREIGN PATENT DOCUMENTS 2704746  10/1977  Fed. Rep. of Germany ........ 426/74
3230292   2/1984  Fed. Rep. of Germany ........ 426/69

Primary Examiner—R. B. Penland
Attorney, Agent, or Firm—Allegretti, Newitt, Witcoff & McAndrews, Ltd.

[57] ABSTRACT

Zinc oxide and zinc carbonate are dry blended with proteinaceous feeds for dairy cattle and beef cattle to protect the protein against rumen digestion. Although zinc oxide and zinc carbonate have limited water solubility and are not prereacted with the protein, milk production in dairy cattle and rate of weight gain in beef cattle can be increased in relation to protein intake.

20 Claims, No Drawings

METHOD OF FEEDING CATTLE TO IMPROVE PROTEIN UTILIZATION

FIELD OF INVENTION

The field of this invention relates to improving protein utilization by cattle. More particularly, the invention relates to a method of feeding proteinaceous feed materials to cattle which protects the protein from rumen digestion.

BACKGROUND OF INVENTION

It has been recognized for some time that protein-providing feed materials which are subject to digestion in the rumen are thereby, in effect, downgraded with respect to the feeding value of the protein. It has been proposed that ideally the protein component of the ruminant feed should be "protected" against being solubilized or metabolized in the rumen, passing therethrough in substantially undegraded form, while remaining digestable and metabolizable in the post-rumen digestive system of the cattle or sheep. The development of a practical way for applying this concept to ruminate nutrition has proven difficult.

U.S. Pat. No. 3,619,200 proposes the application to the vegetable meal or other proteinaceous ruminant feed material of a rumen resistant coating. The purpose of the coating is to protect the proteinaceous feed from microbial attack in the rumen while decomposing and permitting digestion of the feed within the abomasum and small intestine. It is also known that the solubility of protein in ruminant feed materials can be reduced by treating the feed materials with tannin, formaldehyde, or other aldehydes. In addition, a reduction in protein solubility can be obtained by heating the protein. These procedures are summarized with literature references thereto in U.S. Pat. No. 4,186,213. Feed materials which may be treated by one or more of these procedures to reduce the solubility of the protein in the rumen and to protect against rumen destruction include particularly soybean meal and other oil seed meals.

With reference to feeding value lost by rumen destruction, soybean meal has a relatively low protein efficiency value. See Klopfenstein, *Feedstuffs*, July, 1981, 23–24. Since soybean meal is one of the major protein-containing feed materials used with cattle, it is particularly desirable to provide a commercially practical means for protecting soybean meal against rumen destruction while leaving the protein thereof subject to post-rumen digestion and metabolism. For large scale commercial use such a method must be simple, efficient, and of relatively low cost.

I have previously disclosed that water-soluble zinc salts, such as zinc sulfate and zinc chloride, can be combined with proteinaceous feeds for ruminants to improve protein utilization. In one procedure, which I initially preferred, the water-soluble zinc salt is prereacted with the proteinaceous feed materials. (See my published European Patent Application No. 0 107 749.) As described therein, the zinc salt may be applied to the feed material as an aqueous solution and heated in contact therewith. Alternatively, the zinc salt may be dry mixed with the feed materials and then subjected to pelleting, which involves the application of heat in the presence of moisture.

Subsequently, it was found that the pelleting of the zinc salt-containing dry blend was not essential, and that a useful degree of protection of the protein could be obtained by feeding the dry blend containing the water-soluble zinc salt in an unreacted particulate form. (See my South African Patent No. 85/0134.)

Since the zinc in the blend is in the form of a highly water-soluble salt, it was speculated that zinc ions were rapidly formed in the saliva and in the rumen by dissolving of the zinc salt, and that the zinc ions reacted quickly enough with the protein of the feed material to provide effective rumen protection. However, the mechanism action of the zinc salt in the rumen has no been established.

Zinc compounds of limited water solubility such a zinc oxide and zinc carbonate have heretofore been employed for supplying micronutrient zinc to ruminants. As far as is known, no study has been published on the action of rumen fluids on zinc oxide or other zinc compounds of low water solubility. The utilization of zinc as a micronutrient is post-ruminal, and the amount of zinc required as a micronutrient for cattle is quite small, typically not over 50 ppm based on the total daily diet. Small amounts of zinc are present in cattle feed materials, such as proteinaceous oil seed meals, ranging from 25 to 150 ppm. Lease and Williams, *Poultry Science*, 46:233–241, Table 1 at 2364 (1967).

The toxicity of high levels of zinc oxide has been studied: Miller et al., *J. Dairy Sci.*, 48:450–453 (1966); Ott, et al., *J. Anim. Sci*, 25:414–438 (1966). These investigators tested zinc oxide in admixture with ruminant feed materials in amounts greater than micronutrient levels. Miller, et al. fed amounts of zinc to lactating dairy cattle up to 2000 ppm based on the feed concentrate (1279 ppm for total diet). No beneficial effect on milk production was observed by the increased ZnO in the diet. Ott, et al. fed lambs pelleted rations containing from 0.5 to 4.0 grams of zinc per kilogram of diet, and beef cattle from 1.0 to 3.0 grams zinc per kilogram of diet. These rations included soybean meal. Lambs receiving 0.5 to 1.0 grams zinc gained somewhat faster than the controls, but no increase in rate of weight gain was observed for the beef cattle. Ott, et al. reported that steers were less adversely affected by high levels of zinc than heifers.

SUMMARY OF INVENTION

The method of this invention utilizes relatively insoluble zinc compounds for improving protein utilization by dairy or beef cattle. Prior to the present invention, zinc oxide and zinc carbonate would not have been expected to function as rumen-protection equivalents of zinc chloride and sulfate. Zinc oxide and zinc carbonate have low solubilities in water compared to zinc chloride and sulfate.

The zinc oxide or carbonate is dry mixed with the cattle feed material. While the resulting feed compositions may be pelleted for convenience of use, the pelleting does not solubilize the zinc oxide or carbonate. The particulate finely-divided zinc compounds remain as discrete particles unreacted with the protein of the food material. Nevertheless, when the compositions are fed to cattle, the digestibility of the protein in the rumen is appreciably reduced and more effective post-ruminal utilization of the protein is obtained. This result is unexpected and the means by which it is accomplished is not known.

For effective rumen protection of protein using zinc oxide or carbonate, it is important to employ predetermined amounts of the zinc compound. The preferred amounts provide zinc (Zn) equal to 0.01 to 0.02 times the weight percent of total protein in the blended feed composition, that is, 0.01–0.02% per unit (1%) of crude protein. This amount of added zinc oxide or carbonate may be used with a variety of dairy and beef cattle feeds, including complete feeds, feed concentrates, or high protein feed ingredients (viz., soybean meal). The method may be employed to increase milk production for lactating dairy cattle or to increase the rate of weight gain of beef cattle in relation to protein intake of the dairy or beef cattle.

DETAILED DESCRIPTION

The zinc compounds employed for practicing the present invention are zinc oxide (ZnO) and zinc carbonate ($ZnCO_3$). These compounds are commercially available in finely-divided particulate form, that is, as powders. The commercial ZnO and $ZnCO_3$ powders pass through a 200 U.S. Standard mesh screen. Particles of such powders may be in the micron size range (1 to 50 microns). Commercially there are two general kinds of zinc oxide, the less pure and cheaper "Feed Grade" and the purer, more expensive "Reagent Grade". Either kind can be employed for purposes of the present invention, although the Reagent Grade appears to be somewhat more effective. Reagent Grade ZnO is prepared by oxidation of metallic zinc vapors with heated air. Feed Grade ZnO is prepared directly from zinc ores.

For obtaining the rumen protection benefits of this invention, it is important to employ the zinc compounds in effective amounts in relation to the protein content of the feed materials with which the zinc compounds are incorporated. Feed compositions prepared in accordance with this invention will usually include at least 10% protein by weight, determined as nitrogen (N) multiplied by the accepted protein conversion factor, 6.25, i.e., N×6.25. Complete feeds may contain up to 22% protein, feed concentrates up to 42% protein, and proteinaceous meals, particulary soybean meal, up to 50% or more protein. Meat and bone meal, soy protein concentrates, fish meal, and corn gluten meal may contain up to 60% or more protein. The protein percentages are on a dry matter basis.

The amount of the zinc oxide or carbonate to be employed is preferably the amount of zinc equalt to 0.01 to 0.02 times the weight percent protein. For example, if the blended feed materials contain a total of 10% protein, the amount of the zinc from the oxide or carbonate preferably provides a zinc concentration of 0.1 to 0.2% based on the feed material. When the feed composition contains 20% protein, the preferred amount of zinc to be provided in the feed composition is from 0.2 to 0.4%, etc. Excess zinc can be present over these preferred amounts where the concentrate or oil seed meal is to be combined with other protein containing feed ingredients. However, zinc should not be present in amounts which would cause a toxicity problem. Zinc residues in the carcasses of beef cattle, and in the milk of dairy cattle should be avoided. A safe and effective formula is to utilize the zinc compound in the amount providing zinc equal to 0.015 times the estimated total protein of the complete cattle grain diet. Since most roughage does not contain appreciable amounts of protein roughage consumption can usually be disregarded in calculating total diet protein.

The method of this invention may be practiced with any proteinaceous cattle feed composition. In accordance with established nutritional practices, compositions designed specifically for dairy cattle or beef cattle are preferred. Such compositions usually contain as a principal ingredient defatted oil seed meal, or other proteinaceous feed material, such as brewer's grains or distillers grains which are by-products of fermentation of barley, corn, and other seed grains. Proteinaceous meals of animal or microbiological origin can also be used. The materials of vegetable origin include wheat middlings and vegetable oil seed meals such as soybean meal, cottonseed meal, peanut meal, sunflower meal, Canola meal, etc. Other related proteinaceous feed components include animal by-product materials such as fish meal, meat-bone meal, as well as single cell protein materials such as yeast cells or bacterial cells resulting from fermentation processes. The term "single cell protein" refers to dried deactivated micro-organisms used as animal feedstuffs. A particularly advantageous embodiment of this invention uses defatted soybean meal as part or all of the protein component. The soybean meal may be either in the form of untoasted white flakes or toasted meal.

Cattle feed compositions of the kind with which the present invention is particularly useful are in the form of dry mixtures of finely-divided particles which include proteinaceous feedstuffs, usually referred to as "meals", of the kind described above. The feed mixtures may be the kinds referred to in the feed industry as "feed concentrates" or "complete feeds". A feed concentrate is an ingredient mixture containing essential vitamins, minerals, any appropriate medication, and the high-protein feed components. Protein content in dairy and beef cattle concentrates on a dry matter basis may range from about 28% to about 60 weight % (N×6.25). The most common protein-providing ingredients are soybean meal, cottonseed meal, rapeseed and Canola meals, meat and bone meal, wheat middlings, and the like. Often a mixture of more than one protein source is included.

Concentrates, either pelleted or as a mash, can be used to make complete feeds by adding available grains and other energy sources. Complete feeds are compounded mixtures containing all the nutrients of concentrates plus various energy sources such as grains, some fat, and the like. In addition, certain major minerals may be added. The total ingredient mixture is often referred to as a mash. The mash, after pelleting, can be fed as such or as crumbles (crumbled pellets). Alternatively, the mash can be fed without pelleting. For the feeding of cattle, complete feeds are usually fed together with roughages, such as forage crops, hay, alfalfa, haylage, corn silage, and the like. Dairy and beef cattle complete feeds can vary from about 10 to 22% protein (% N in dry matter×6.25).

For convenience of handling and incorporation in a feed concentrate or complete feed, the zinc compound may be combined with a premix. Premixes are products containing vitamins, minerals, and appropriate medications. Such premixes may include a carrier to increase bulk, and, hence, improve distribution in preparing a more complete feed material. These carriers may include soy mill run, rice bran, and similar edible plant by-products. Such premixes are used to formulate cattle feed concentrates and complete feeds.

Standard mixing and blending equipment may be employed for practicing the present invention. In one procedure, the ZnO or $ZnCO_3$ powder is first mixed with the proteinaceous components, and the other components are subsequently added, such as a vitamin-containing premix, etc. No special order of addition or mixing is required to achieve the benefits of this invention. It is desirable to provide sufficient mixing to achieve a substantially uniform distribution of the zinc compound throughout the dry mix. This is also a desirable requirement for all components of the feed mix, that is, the resulting blend is substantially homogenous. After forming of the dry mix, it may be pelleted. However, pelleting does not cause the zinc oxide or carbonate to prereact with the protein as it does with more water-soluble zinc salts like zinc sulfate. Pelleting is not essential, and unpelleted dry mixes may be fed to achieve the rumen protection of the protein i the feedstuffs. Pelleting does help to maintain uniform distribution of the zinc compound in the feed composition.

The method of this invention can be practiced with either dairy cattle or beef cattle. The method is particularly advantageous for dairy cattle which are being fed a complete feed in pelleted form. However, as indicated above, it can also be practiced with feed concentrates or high protein oil seed meals, as used with either dairy cattle or beef cattle.

Feed composition containing the zinc oxide or carbonate in the amounts specified above are fed to the dairy cattle or beef cattle on a daily basis. The amount fed should be effective for increasing milk production in lactating dairy cattle, or for increasing the rate of weight gain and/or feed efficiency in beef cattle. Feeding is continued until and for as long as the desired result is obtained. In dairy cattle, for example, complete feeds prepared in the manner described may be used as a standard ration for the dairy cattle being fed daily on a continuing basis. The amount of protein required for producing the same amount of milk can thereby be substantially reduced. For example, as much milk may be produced with a complete feed containing 15% protein and 0.015 zinc times the percent protein as an otherwise comparable feed containing 18% protein. With beef cattle, the method is believed to be most advantageous during their growing phase, such as in the weight range from 400 to 800 lbs.

The experimental and practical basis of the present invention is further illustrated by the following examples.

EXAMPLE I

Enzyme indigestibility as determined by measuring the rate and extent in vitro of protein degradation by proteases is a useful tool in evaluating the rumen by-pass potential. Suitable test procedures are described in Poos et al., "A Comparison of Laboratory Techniques to Predict Ruminal Degradation of Protein Supplements"., *J. Anim. Sci., Abstr.* 679, p. 379 (1980); and Rock et al., "Estimation of Protein Degradation with Enzymes", *J. Anim. Sci., Abstr.* 121, p. 118 (1981). The utility of enzyme degradation in vitro as a predictor of potential rumen degradation has been established by application to a series of standard protein supplements whose true rumen by-pass properties have been determined in cattle with abomasal fistulas. The preferred enzyme is ficin which was employed in the tests described below. The values determined are expressed as percent of protein available and undegraded (% AUN) after the enzyme treatment.

The studies were conducted with the same batch of soybean meal which contained 48.6% protein and 55 ppm indigenous zinc. The toasted soybean meal had been prepared by a standard commercial process. The reagents used were Feed Grade zinc oxide, Reagent Grade zinc oxide, Reagent Grade zinc carbonate, and Feed Grade zinc sulfate. The amount of zinc to be added with each of these zinc compounds was calculated as $0.015 \times \%$ protein. The zinc compounds in the form of dry powders were dry blended with the soybean meal to produce a uniform distribution. The resulting mixtures were not pelleted or otherwise processed, and were subjected to the enzyme indigestibility test, using three replicates of each composition.

All samples were held in the test buffer solution for approximately 0.5 hours prior to addition of the ficin enzyme, and then for a 2 hour incubation. The results are summarized below in Table A.

TABLE A

| Treatment | Av. % AUN[1] |
| --- | --- |
| SBM untreated | 31.9 ± 2.6 |
| Zinc oxide (reagent grade) | 37.4 ± 2.0 |
| Zinc oxide (feed grade) | 32.4 ± 0.7 |
| Zinc carbonate (reagent grade) | 38.8 ± 2.7 |
| Zinc Sulfate (feed grade) | 39.7 ± 2.5 |

[1]Percent protein available and undegraded plus or minus one standard deviation.

EXAMPLE II

A complete dairy cattle ration was prepared, providing approximately 15% protein. Portions of the formulation were dry blended zinc oxide powder (Feed Crade) and zinc sulfate powder (Feed Grade) in amounts providing zinc equal to 0.015 times the % protein. Another complete dairy feed formulation was employed for comparison, the formulation containing approximately 18% protein but otherwise being comparable to the 15% formulation. All of the compositions were pelleted prior to being tested. The test samples were analyzed for percent protein and ppm Zn. Enzyme indigestibiliy tests were conducted as described in Example I, except that test samples were held in the buffer solutions for approximately 18 hours prior to addition of the ficin and the 2 hour incubation. Replicate samples were determined for each test. The results are summarized below in Table B.

TABLE B

| Sample | % Protein | ppm Zn[2] | Av. % AUN |
| --- | --- | --- | --- |
| 15% Protein Untreated[1] | 15.3 | 200 | 35.4 |
| 15% Protein w/ZnO | 15.1 | 2180 | 38.8 |
| 15% Protein w/ZnSO$_4$ | 14.6 | 2310 | 47.6 |
| 18% Protein untreated[1] | 17.8 | 168 | 34.0 |

[1]Zinc methionate added at 45 ppm zinc.
[2]Figures represent indigenous zinc plus added zinc (approx. 80 ppm Zn in trace mineral premix).

EXAMPLE III

The pelleted dairy cattle feeds described in Example II were tested with dairy cattle. With the exception of roughage, which was available ad libitum, the pelleted feeds comprised the complete grain diet of the animals for an eight week test period. The test animals were 36 lactating Holstein cows divided into three groups, and assigned to feeding stalls according to milk production and stage of lacation. The cows were fed a normal ration for a two-week preliminary period during which measurements were made of milk production, butterfat, and milk protein. The results are reported below in Tables C and D.

TABLE C

| Feed | 2-wk Prelim. Feed Intake | 2-wk Prelim. Milk (lbs) | 8-wk Test Feed Intake | 8-wk Test Milk (lbs) | Lbs. Milk Decline |
| --- | --- | --- | --- | --- | --- |
| 15% Protein w/ZnSO4 | 21 | 52.6 | 18.7 | 46.8 | −5.8 |
| 15% Protein w/ZnO | 22.8 | 57.1 | 20.3 | 50.8 | −6.3 |
| 18% Protein Untreated | 22.1 | 55.3 | 19.9 | 49.7 | −5.6 |

TABLE D

| Feed | 2-wk Prelim. % Butterfat | 2-wk Prelim. % Protein | 8-wk Test % Butterfat | 8-wk Test % Protein |
| --- | --- | --- | --- | --- |
| 15% Protein w/ZnSO4) | 3.1 | 3.14 | 3.4 | 3.33 |
| 15% Protein w/ZnO | 3.1 | 2.95 | 3.2 | 3.13 |
| 18% Protein Untreated | 3.1 | 2.94 | 3.4 | 3.13 |

The milk production of all groups declined as expected, over the period of the test, since the test started with animals in the declining phase of lacatation. The average decline for all groups was generally comparable. The 15% protein feeds containing either ZnO or ZnSO4 were shown to be equivalent in protein nutrition value to the untreated 18% protein feed. This indicates that ZnO as well as ZnSO4 were providing rumen by-pass protection for the protein.

I claim:

1. The method of feeding dairy cattle to improve protein utilization for milk production, comprising:
   (a) preparing a feed composition by dry blending proteinaceous dairy cattle feed material with a particulate finely-divided zinc compound selected from the group consisting of zinc oxide and zinc carbonate, said feed composition on a dry weight basis containing at least 10 weight percent protein together with an amount of zinc provided by said zinc compound equal to 0.01 to 0.02 times the weight percent protein;
   (b) feeding the resulting composition to lactating dairy cattle in amounts effective to increase their milk production in relation to protein intake and
   (c) continuing said feeding until said milk production is increased.

2. The method of claim 1 in which said feed material is a complete dairy cattle feed, and the blended feed composition is pelleted.

3. The method of claim 1 in which said feed material is a dairy cattle feed concentrate, and the blended composition is pelleted.

4. The method of claim 1 in which said feed material is an oil seed meal, and the blended composition is pelleted.

5. The method of claim 1 in which said feed material is soybean meal, and the blended composition is pelleted.

6. The method of claim 1 in which the zinc compound is zinc oxide.

7. The method of claim 1 in which the zinc compound is zinc carbonate.

8. The method of feeding dairy cattle to improve protein utilization for milk production, comprising:
   (a) preparing a feed composition by admixing a complete dairy cattle feed with a zinc compound in powder form selected from the group consisting of zinc oxide and zinc carbonate, said dairy cattle feed on a dry weight basis containing from 10 to 24 weight percent protein together with an amount of zinc provided by said zinc compound equal to 0.01 to 0.02 times the weight percent protein;
   (b) feeding the resulting composition to lactating dairy cattle in amounts effective to increase their milk production in relation to protein intake; and
   (c) continuing said feeding until said milk production is increased.

9. The method of claim 8 in which the zinc compound is zinc oxide, and the feed composition is pelleted after admixing.

10. The method of claim 8 in which the zinc compound is zinc carbonate, and the feed composition is pelleted after admixing.

11. The method of feeding beef cattle to improve protein utilization for meat production, comprising:
    (a) preparing a feed composition by dry blending beef cattle feed material with a particulate finely-divided zinc compound selected from the group consisting of zinc oxide and zinc carbonate, said feed composition containing at least 10 weight percent protein together with an amount of zinc provided by said zinc compound equal to 0.01 to 0.02 times the weight percent protein;
    (b) feeding the resulting composition to growing beef cattle in amounts effective to increase their rate of weight gain in relation to protein intake; and
    (c) continuing said feeding until said rate of weight gain is increased.

12. The method of claim 11 in which said feed material is a complete beef cattle feed, and the blended feed composition is pelleted.

13. The method of claim 11 in which said feed material is a beef cattle feed concentrate, and the blended feed composition is pelleted.

14. The method of claim 11 in which said feed material is an oil seed meal, and the blended composition is pelleted.

15. The method of claim 11 in which said feed material is soybean meal, and the blended composition is pelleted.

16. The method of claim 11 in which the zinc compound is zinc oxide.

17. The method of claim 11 in which which the zinc compound is zinc carbonate.

18. The method of feeding beef cattle to improve protein utilization for meat production, comprising:
    (a) preparing a feed composition by admixing a complete beef cattle feed with a particulate finely-divided zinc compound selected from the group consisting of zinc oxide and zinc carbonate, said feed containing from 10 to 22 weight percent protein together with an amount of zinc provided by said zinc compound equal to 0.01 to 0.02 times the weight percent protein;
    (b) feeding the resulting composition to growing beef cattle in amounts effective to increase their rate of weight gain in relation to protein intake; and
    (c) continuing said feeding until said rate of weight gain is increased.

19. The method of claim 18 in which the zinc compound is zinc oxide, and the feed composition is pelleted after admixing.

20. The method of claim 18 in which the zinc compound is zinc carbonate, and the feed composition is pelleted after admixing.

* * * * *